United States Patent
Kovach et al.

(10) Patent No.: US 10,136,574 B2
(45) Date of Patent: Nov. 27, 2018

(54) ROW CLEANER SUSPENSION FOR AGRICULTURAL IMPLEMENT

(71) Applicant: CNH Industrial America LLC, New Holland, PA (US)

(72) Inventors: Michael G. Kovach, Morton, IL (US); Nowell Moore, Congerville, IL (US); David Long, Washington, IL (US)

(73) Assignee: CNH Industrial America LLC, New Holland, PA (US)

( * ) Notice: Subject to any disclaimer, the term of this patent is extended or adjusted under 35 U.S.C. 154(b) by 75 days.

(21) Appl. No.: 15/232,284

(22) Filed: Aug. 9, 2016

(65) Prior Publication Data

US 2018/0042170 A1 Feb. 15, 2018

(51) Int. Cl.
| | | |
|---|---|---|
| *A01C 7/20* | (2006.01) | |
| *A01C 7/00* | (2006.01) | |
| *A01C 5/06* | (2006.01) | |
| *A01B 35/16* | (2006.01) | |
| *A01B 63/00* | (2006.01) | |
| *A01B 35/28* | (2006.01) | |

(52) U.S. Cl.
CPC .............. *A01C 7/205* (2013.01); *A01B 35/16* (2013.01); *A01B 35/28* (2013.01); *A01B 63/008* (2013.01); *A01C 5/064* (2013.01); *A01C 7/006* (2013.01)

(58) Field of Classification Search
CPC ......... A01C 7/006; A01C 7/205; A01C 7/208; A01C 5/06; A01C 5/064; A01B 35/16; A01B 63/008; A01B 35/28
See application file for complete search history.

(56) References Cited

U.S. PATENT DOCUMENTS

| | | | | |
|---|---|---|---|---|
| 2,736,279 A | * | 2/1956 | Johnston | A01C 23/024 |
| | | | | 111/125 |
| 4,102,406 A | * | 7/1978 | Orthman | A01B 13/16 |
| | | | | 172/177 |
| 4,579,071 A | * | 4/1986 | Johnson | A01C 5/068 |
| | | | | 111/195 |
| 4,796,550 A | * | 1/1989 | Van Natta | A01B 39/08 |
| | | | | 111/122 |
| 5,394,946 A | * | 3/1995 | Clifton | A01C 5/064 |
| | | | | 111/140 |
| 7,946,231 B2 | * | 5/2011 | Martin | A01B 35/16 |
| | | | | 111/140 |
| 9,609,802 B2 | * | 4/2017 | Needham | A01C 5/068 |
| 2011/0283927 A1 | * | 11/2011 | Shoup | A01B 35/16 |
| | | | | 111/139 |
| 2012/0261149 A1 | * | 10/2012 | Schmidt | A01C 5/064 |
| | | | | 172/558 |
| 2014/0190382 A1 | * | 7/2014 | Anderson | A01C 5/066 |
| | | | | 111/193 |

* cited by examiner

*Primary Examiner* — Alicia Torres
(74) *Attorney, Agent, or Firm* — Rebecca L. Henkel; Rickard K. DeMille

(57) ABSTRACT

A suspension system for a row cleaner used with an agricultural row unit. A base is connectable with the agricultural row unit and a support is provided for journaling row cleaner sweeper blades. Links pivotally connect the base and the support for up and down movement of the sweeper blades towards the ground. A pair of coil springs have one end connected to the upper links and the other a free end. A series of holes in the base receive an adjustment pin to provide preselected levels of downward force towards the ground.

15 Claims, 2 Drawing Sheets

ROW CLEANER SUSPENSION FOR AGRICULTURAL IMPLEMENT

BACKGROUND OF THE INVENTION

1. Field of the Invention

The present invention generally relates to agricultural implements, and, more particularly, to suspension systems for row cleaners used with such implements.

2. Description of the Related Art

Farmers use a wide variety of seeding and fertilizing implements to make a trough in the soil as the implement is towed across a field and to place seeds or fertilizer in such troughs. When these agricultural procedures are practiced using a no tillage or minimum tillage approach, any residue from the previous crop still remains in the field. The remaining residue or mulch can interfere with the disk, shank/knife or other device forming the trough so row cleaners have been adopted as a result.

Row cleaners are positioned on each seeding or fertilizing unit ahead of the ground penetrating component. The row cleaners usually consist of star or serrated blades oriented to interlace with one another and to engage the ground ahead of the path of the component which forms the trough. The movement of the implement through the field causes the row cleaner to clear the accumulated residue and mulch to facilitate a more effective formation of the trough. One of the issues confronting the use of row cleaners is the amount of down force applied to the star blades. This is because the conditions of the field vary in terms of moisture, debris accumulation and other factors. Accordingly, it is necessary to apply variable amounts of down force.

While suspension systems for row cleaners have been proposed that vary the down force, they are complicated and require an additional tool for manipulating the force. Owing to normal field conditions, it is likely that the tool can be lost or mislaid.

Accordingly, what is needed in the art is an extremely simplified and self contained system for adjusting the down force on a row cleaner.

SUMMARY OF THE INVENTION

The present invention seeks to provide a suspension system for a row cleaner that enables the down force to be adjusted, but in a simplified, direct and efficient manner.

In one form, the invention is a suspension system for a row cleaner used with an agricultural row unit. The suspension system includes a base connectable with the agricultural row unit, and a support for journaling row cleaner serrated sweeper blades. Links pivotally interconnect the base and support to permit the parallel up and down movement of the support relative to said base. A spring has one end acting on at least one of the parallel links and at the other end on a selectively positioned abutment in the form of an adjustment pin interacting with the base to apply different pressures on the at least one link to urge the support in a ground direction.

In another form, the invention is an agricultural implement including a tool bar positioned laterally relative to the direction of travel across a field. Ground support wheels direct the tool bar across the field. The tool bar supports a row cleaner including a base connectable with the tool bar. A support journals row cleaner tooth sweeper blades. A plurality of links pivotally interconnect the base and the support for permitting up and down parallel movement of the support relative to the tool bar. A spring has one end acting on at least one of the links and at the other end on a selectively positioned abutment in the form of an adjustment pin interacting with the base to apply different pressures on the at least one link to urge the support in a ground direction to apply variable pressure on the row cleaner tooth sweeper blades.

An advantage of the invention is the simplified provision of adjustable variable ground pressure on row cleaners.

Another advantage is that the adjustment is provided without the need for external tools.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiment of the invention and such exemplification is not to be construed as limiting the scope of the invention in any manner.

DETAILED DESCRIPTION OF THE INVENTION

Figure 1:
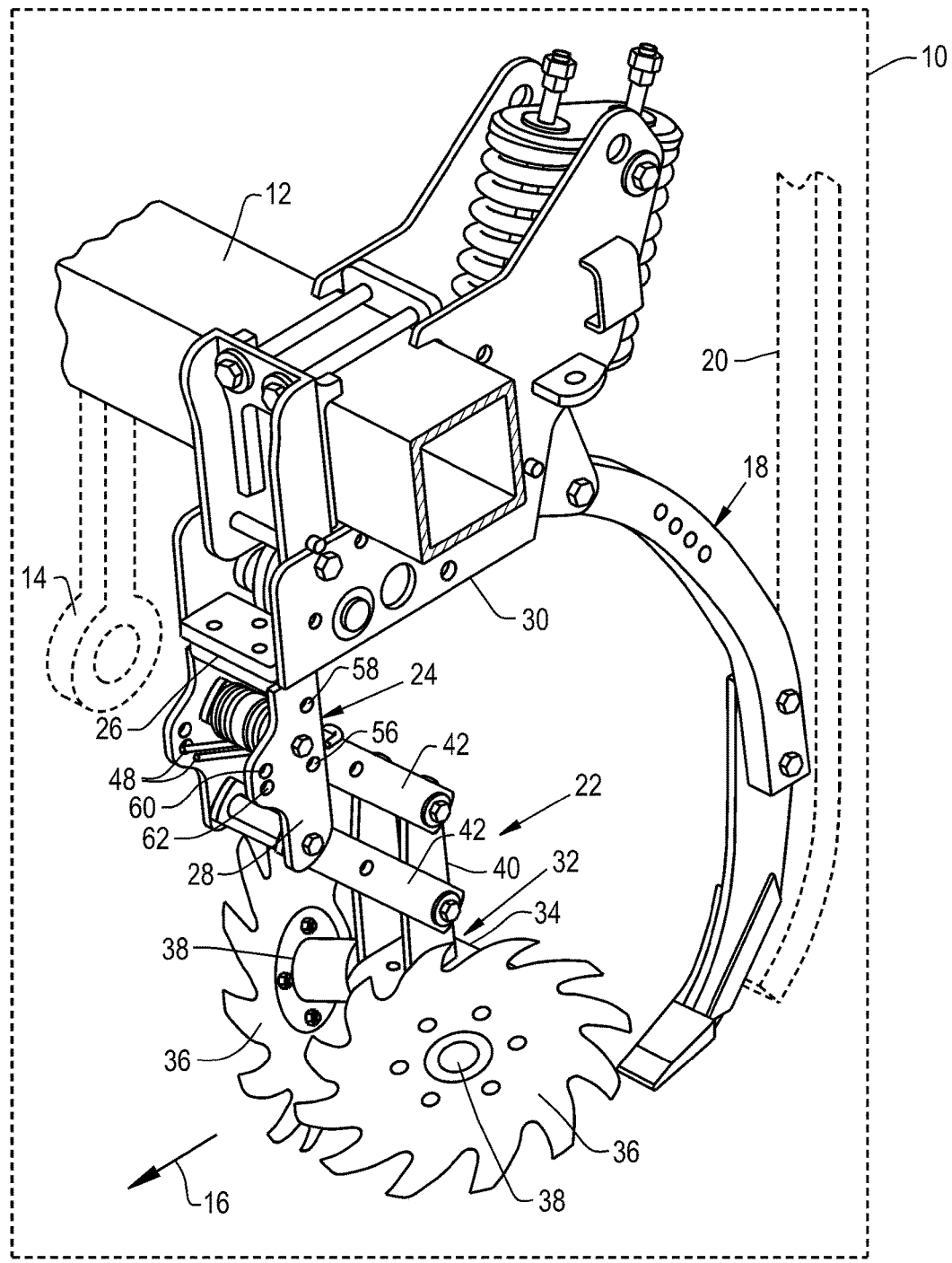
FIG. 1 is a perspective of an agricultural implement with a row cleaner embodying the present invention; and, FIG. 2 is a fragmentary expanded view of a portion of row cleaner of FIG. 1.
Figure 2:
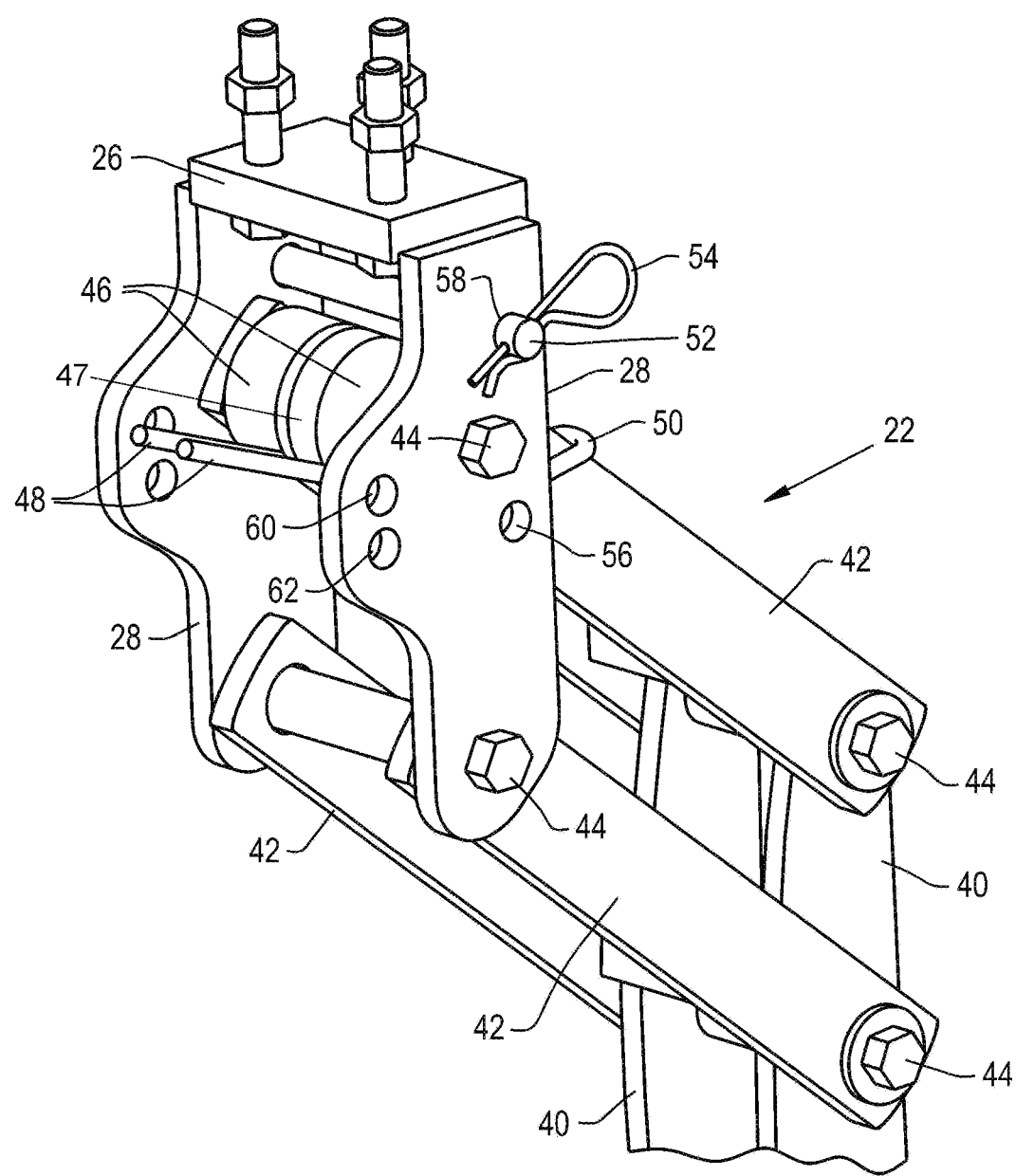

Referring now to the drawings, and more particularly to FIGS. 1 and 2, there is shown an agricultural implement 10 including a tool bar 12 guided for ground movement by ground support wheels 14 (shown in dashed lines) in a direction of ground movement 16. Agricultural implement 10 may be employed for a number of farming applications, but is shown herein as applying fertilizer. For this purpose, a plurality of shank and knife assemblies 18 are appropriately secured to tool bar 12, to penetrate the ground and support a fertilizer tube 20 to distribute suitable fertilizer at a preselected depth. Additional components (not shown) are employed to close and dress the ground after movement of the shank and knife assembly 18 through a field.

In order to achieve an efficient no till or minimum till farming operation, a row cleaner 22 is positioned upstream of each shank and knife assembly 18. The row cleaner 22 includes a base 24 formed from a mounting plate 26 connected to parallel side plates 28. The mounting plate 26 is suitably affixed to a bracket 30 attached to tool bar 12. A support 32 has a base 34 for journaling a pair of row cleaner toothed sweeper blades 36 journaled at 38 at an angle from one another. Side plates 40 extend from base 34 and are connected to upper and lower links 42 by appropriate pins 44. Pins 44 also pivotally connect the links 42 to the side plates 28 of base 24. The purpose of the row cleaner 22 is to remove stubble and prior crop material from the path of the shank and knife assembly as it passes through a field. In the past, some units have relied merely on the weight of the row cleaner assembly 22 to provide adequate ground pressure. In accordance with the present invention, the row cleaner 22 is provided with an adjustable pressure as described below. A pair of coil springs 46 are received over the upper pin 44 extending between side plates 28. A separation collar 47 is positioned between the coil springs 46 for separation and alignment. Each coil spring 46 has a free end 48 extending tangentially from the circumference of the coil spring 46. Each coil spring 46 also has a hook end 50 configured to wrap over and apply pressure to the upper links 42. An adjustment pin 52 is provided to be received in one of a plurality of aligned adjustment holes and has a flange on one end (not shown) and an appropriate retaining pin 54 on the other end to removably retain the adjustment pin 52 in a selected hole.

With particular reference to FIG. 2, the adjustment pin 52 may be positioned in the transport adjustment hole 56. In the transport position elevates the upper links 42 and thus the row cleaner assembly 22 significantly above the ground for transport conditions. The adjustment pin 52 is also selectively received in float adjustment holes 58 in side plates 28 in which the support 32 and corresponding row cleaner tooth sweeper blades 36 may be urged towards the ground by gravity. If an intermediate pressure is desired, the adjustment pin 52 may be inserted in the intermediate pressure adjustment hole 62 to act on the free end 48 of each coil spring 46 in an upward direction to cause the hook end 50 to urge the upper links 42 and hence the entire assembly in a direction toward the ground. If a higher pressure is desired, the adjustment pin 52 is inserted in higher pressure adjustment holes 60 in the side plates 28, which urges the upper links 42 and hence the row cleaner 22 towards the ground with a higher pressure.

The above construction enables a highly simplified yet effective way of adjusting the downward pressure on a row cleaner, particularly in the field. No additional tools need be employed and if for some reason the adjustment pin is mislaid may be easily replaced with standard parts. The result of this advancement is improved soil conditioning prior to fertilization. While it has been shown in connection with fertilizer application, it should be apparent to those skilled in the art that the row cleaner described above may be used in many other forms of agricultural implements, for example seeders and planters.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A suspension system for a row cleaner used with an agricultural row unit, said suspension system comprising:
    an upper base connectable with said agricultural row unit;
    a support base carrying row cleaner toothed sweeper blades;
    a plurality of links pivotally interconnecting said upper base and support base for permitting up and down parallel movement of said support base relative to said upper base; and,
    a spring carried on a carrying pin between a pair of base side plates of the upper base, the carrying pin connected to the pair of base side plates, the spring having an attachment end positioned against and acting on at least one link of said plurality of links, and the spring having an opposite free end which is configured to be selectively positioned via an adjustment pin positionable between the pair of base side plates of the upper base via a plurality of holes formed in the pair of base side plates, the adjustment pin positionable against the free end of the spring to permit tension to be exerted on the free end and transmitted to the spring and to the attachment end positioned against the at least one of the links to permit application of selected pressures on said at least one link to urge said support base carrying the row cleaner toothed sweeper blades in a ground direction,
    wherein the upper base comprises a mounting plate and the pair of base side plates, and
    wherein the support base includes a pair of support side plates with the plurality of links pivotally connecting the pair of base side plates to the pair of support side plates.

2. The suspension system as claimed in claim 1, wherein said spring is a coil spring.

3. The suspension system as claimed in claim 2, wherein the attachment end includes a hook to be received over on of said links while the free end of the spring is positionable to abut against said adjustment pin.

4. The suspension system as claimed in claim 3, wherein said adjustment pin is selectably received in two aligned holes of the plurality of holes.

5. The suspension system as claimed in claim 4, wherein said adjustment pin has a flange on one end and a removable retaining pin on the other end to provide selective positioning of said adjustment pin.

6. The suspension system as claimed in claim 1, wherein said pair of base side plates have aligned holes in preselected positions, one of which is a transport position in which the adjustment pin positioned through the selected holes supports said upper links in an elevated transport position.

7. The suspension system as claimed in claim 6, wherein said pair of base side plates have a second set of aligned holes in which the adjustment pin permits floating of the support base by gravity and a third set of aligned holes in which the adjustment pin acts on the free end of said spring to apply an intermediate pressure and a fourth set of aligned holes in which the adjustment pin applies a higher pressure in a direction to urge the support base towards the ground.

8. The suspension system as claimed in claim 6, wherein said spring is a coil spring and the attachment end includes a hook at one end for being received over the at least one link and a free end abuttable with said adjustment pin to apply varying pressure.

9. The suspension system as claimed in claim 8, having a pair of coil springs positioned over pivotally connected ends of two links of the plurality of links, each of said coil springs having an attachment end including a hook end connected to one of the two links and each of said coil springs having the free end thereof abuttable by said adjustment pin, and a collar positioned between the coil springs for separating said coil springs.

10. An agricultural implement comprising:
    a tool bar extending laterally with respect to the direction of ground movement;
    a plurality of ground support wheels for guiding said tool bar in said direction;
    a plurality of row cleaner assemblies operably coupled to the tool bar, each row cleaner assembly comprising:
        an upper base connectable with said tool bar;
        a support base carrying one row cleaner assembly comprising a pair of row cleaner tooth sweeper blades;
        a plurality of links pivotally interconnecting said upper base and said support base for permitting up and down movement of the support base relative to the upper base; and, a spring carried by the upper base and having one attachment end acting on at least one of said plurality of links and a free end opposite of the one attachment end positioned in a selectively positioned abutment against an adjustment pin interacting with said upper base via a plurality of holes positioned therein through which the one adjustment pin is positionable to apply selected pressures through said free end to the spring, to the one attachment end, and to the at least one link to urge the support base and the row cleaner assembly thereon in a ground direction, wherein the upper base comprises a mounting plate and a pair of base side plates, the support base comprises a pair of support side plates, and upper and lower links of the plurality of links pivotally connect the pair of base side plates to the pair of support side plates.

11. The agricultural implement as claimed in claim 10, wherein the spring is carried on a pin that extends between and is connected to the pair of base side plates, and wherein said spring comprises at least one coil spring received over said pin.

12. The agricultural implement as claimed in claim 11, wherein said coil spring has formed on the one attachment end thereof a hook received over an adjacent link.

13. The agricultural implement as claimed in claim 12, wherein said adjustment pin has a flange on one end and a removable cotter pin on the other end for selective insertion in said holes.

14. The agricultural implement as claimed in claim 12, wherein the pair of base side plates have aligned holes for receiving said adjustment pin, one set of holes positioned so that the adjustment pin supports said link in an elevated transport position, another set of aligned holes allow the support base to float based on a weight of the support base, still another set of aligned holes receiving the adjustment pin to apply an intermediate pressure on the free end of said coil spring to urge each row cleaner assembly carried by the support base in a ground direction at an intermediate pressure level and yet another set of aligned holes for receiving the adjustment pin to apply a higher pressure on the free end of said coil spring to urge each row cleaner assembly carried by the support base towards the ground.

15. The agricultural implement as claimed in claim 10, further comprising a shank and knife assembly adjacent and downstream of each row cleaner assembly.

* * * * *